United States Patent [19]

Jacobellis

[11] 4,163,461
[45] Aug. 7, 1979

[54] HIGH FREQUENCY PULSE DAMPENER

[75] Inventor: Alfonse A. Jacobellis, Woodland Hills, Calif.

[73] Assignee: Greer Hydraulics, Inc., Chatsworth, Calif.

[21] Appl. No.: 871,503

[22] Filed: Jan. 23, 1978

[51] Int. Cl.² ............................................. F16L 55/04
[52] U.S. Cl. ..................................................... 138/30
[58] Field of Search ..................... 138/26, 30; 417/540, 417/542, 543

[56] References Cited

U.S. PATENT DOCUMENTS

| | | | |
|---|---|---|---|
| 2,489,491 | 11/1949 | Johnson | 138/30 |
| 3,782,418 | 1/1974 | Zahid | 138/26 |
| 3,857,413 | 12/1974 | Zahid | 138/26 |
| 3,868,972 | 3/1975 | Zirps | 138/30 |
| 3,948,288 | 4/1976 | Mayer | 138/30 |

FOREIGN PATENT DOCUMENTS

| | | | |
|---|---|---|---|
| 20899 | 5/1858 | France | 138/30 |
| 540036 | 10/1941 | United Kingdom | 138/30 |

*Primary Examiner*—Richard R. Stearns
*Attorney, Agent, or Firm*—Arthur B. Colvin

[57] ABSTRACT

The present invention is directed to a pulse dampener device especially effective for the efficient damping of high frequency pulses of relatively small amplitude. The invention is characterized by the provision of a low inertia diaphragm assembly disposed in intimately spaced relation to a conduit through which flows the fluid to be damped, said conduit including a rigid partition or baffle member providing for deflection of a substantial portion of the fluid flowing through the conduit to react against the diaphragm in a direction substantially perpendicular to the plane thereof and providing a tortuous path for the fluid from one side of the partition to the other before continuance of its flow.

2 Claims, 3 Drawing Figures

HIGH FREQUENCY PULSE DAMPENER

BACKGROUND OF THE INVENTION

1. Field of the Invention

The present invention is in the field of pulse dampener devices, and more particularly is directed to a dampener device for the damping of high frequency pulses.

2. The Prior Art

As conducive to an understanding of the invention, it should be noted that in a hydraulic system employing a reciprocating pump, especially of the multi-piston type, pulses are generated, the frequency of such pulses being dependent upon the number of pistons in the pump and the speed with which the pump is operated.

Generally speaking, multiple piston pumps operating at high speed, generate for a given output, pulses of smaller amplitude but higher frequency than pumps having fewer pistons.

The deleterious effects of pulses in a hydraulic system are well known, such effects being discussed in detail as, for instance, in U.S. Pat. No. 3,782,418. Should the resonant frequency of the pulses generated in a given system, and especially high frequency pulses, match the resonant frequency of certain fittings and connections in a hydraulic system, and should the amplitude of such pulses be sufficient, a sympathetic harmonic reaction within the system may, at worst, induce breakage of components of the system throughout the system, and at the least, transmit undesirable vibrations throughout the system.

It is conventional, in order to reduce the amplitude of the pulses, to employ a pulse dampener device, such as is illustrated in the above referenced United States Patent.

While dampeners of the type described are extremely effective in reducing the amplitude of pulses of relatively low frequency, i.e., in the area of from about 0 to 200 Hz, they are less effective against higher frequencies, in the range from 300 Hz or above.

SUMMARY OF THE INVENTION

The present invention is predicated upon the discovery that pulses of high frequency may be more efficiently damped than in devices heretofore known, by associating with a conduit member for the fluid under pressure and more particularly with an aperture in the conduit aligned with a transverse baffle therein, the inlet of a pressure vessel which incorporates a diaphragm having a valve member adapted to close said inlet and by disposing the inlet of the pressure vessel in intimate juxtaposition to the conduit and to the diaphragm. In this manner the fluid entering the inlet will impinge against a large area of the diaphragm in a flow direction substantially perpendicular to the plane of the diaphragm.

It has further been discovered that by having the area of the inlet into the pressure vessel, a substantial portion of the area of the diaphragm the effectiveness of the dampening of high frequency impulses is greatly enhanced.

The invention is characterized by the provision of an inexpensive and easily assembled pulse dampener device consisting essentially of a base casing incorporating the main conduit, an upper casing adapted to be clamped to the base casing and a diaphragm adapted to be disposed between said two casings, whereby expensive machining and deep drawing operations associated with prior devices of the type described are obviated, the casing preferably being cast from suitable material.

The invention is further characterized by the ability to modify the characteristics of the device by simply substituting for the upper casing defining the gas chamber of the pressure vessel a casing of different size, whereby the device may be accommodated to different operating parameters.

Accordingly, it is an object of the invention to provide an inexpensive pulse dampener device for insertion in the fluid line of a hydraulic system, said dampener device being especially effective in the damping of high frequency pulses.

A further object of the invention is the provision of a pulse dampener of the type described which may be constructed of two cast parts and is adapted to various operating parameters by a substitution of one modified cast part for another.

In the accompanying drawings in which is shown one of various possible embodiments of the several features of the invention:

Figure 1:
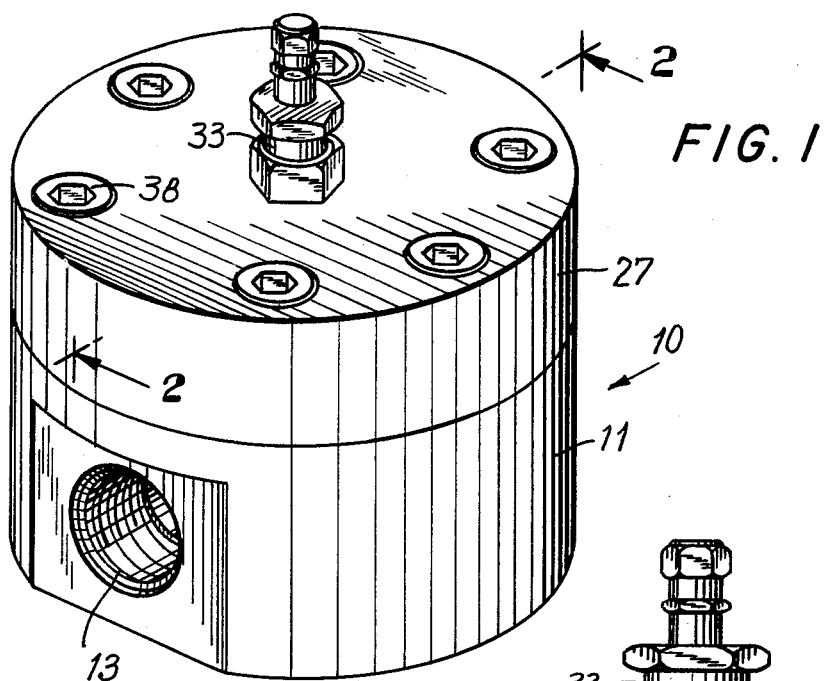
FIG. 1 is a perspective view of a dampener device in accordance with the invention.
Figure 2:
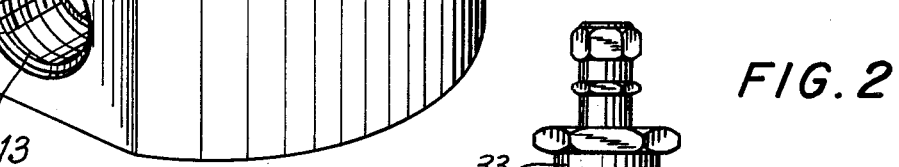
FIG. 2 is a sectional view of the device taken on the line 2—2 of FIG. 1.
Figure 3:
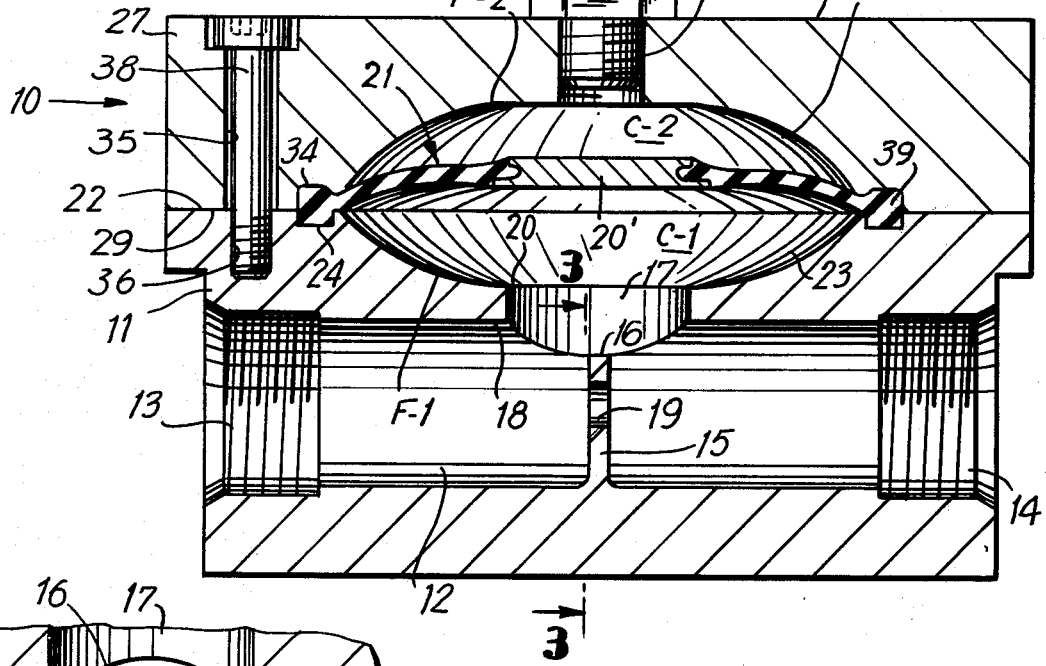
FIG. 3 is a detail sectional view taken along line 3—3 of FIG. 2.
Figure 3:
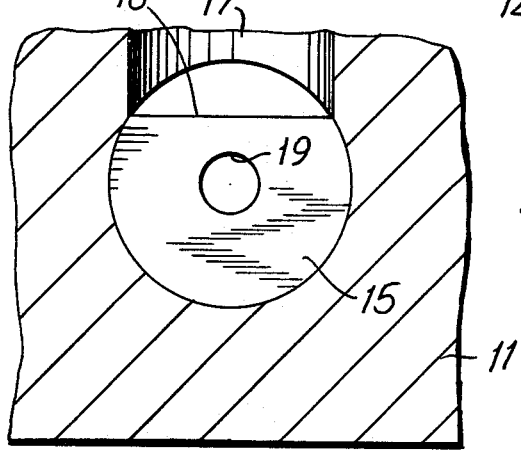

Referring now to the drawings, the dampener device 10 includes a base casing 11 defining a conduit or bore 12 for the passage therethrough of hydraulic fluid under pressure, it being the function of the device to damp the amplitude of pulses, and particularly high frequency pulses, in the hydraulic fluid.

The casing 11 includes an entrance port 13 and an exit port 14, both internally threaded for enabling the device to be interposed in a hydraulic line, it being understood that while the ports have been described as "entrance" and "exit", the flow direction may be reversed.

The casing 11 includes a central rigid partition or baffle member 15 which is substantially circular in transverse section, the partition 15 having its upper periphery truncated as at 16 and extending transversely across the conduit 12 and integral with the inner wall surface thereof. The baffle 15 is in registry with the upwardly directed bypass aperture or port 17 formed in the top wall 18 of the conduit 12 in casing 11.

The partition 15 includes a central restricted flow aperture 19 axially aligned with the conduit 12, the aperture 19 encompassing and preferably being concentric with the axis of the conduit.

The upper periphery 20 of port 17 defines a valve seat for valve member 20' carried by diaphragm 21, as hereinafter described. It will be noted that such valve seat 20 is closely spaced to the uppermost edge portion 16 of the partition 15.

The casing 11 has a top surface 22 with a central concave recess 23 into which port 17 axially extends, said recess defining the oil chamber C-1 of the device. An annular upwardly facing groove 24 is formed in the top surface 22 adjacent the periphery of recess 23.

A second casing 27 is positioned on the top surface of casing 11. The casing 27 may be circular in transverse section, having a top wall surface 28 and a bottom wall surface 29 which seats on surface 22 of casing 11.

The casing 27 also has a concave recess 31 which is complementary to and aligned with the recess 23 and defines a gas chamber C-2. A port 32 extends through the top surface 28 and is axially aligned with recess 31, the port 32 being internally threaded and accommodating a gas charging valve 33. An annular downwardly facing groove 34 is formed in the bottom surface 29 adjacent the periphery of recess 31 and is aligned with the complentary groove 24 in the casing 11.

The valve 20' is carried by the diaphragm 21 formed of resilient elastomeric material, such as Neoprene, which is unaffected by the hydraulic fluids which will be encountered.

The rigid, disc-like valve member 20' is bonded to the diaphragm 21 and preferably molded integrally therewith and is axially aligned with port 17 and is of larger diameter than the latter so that it may move against seat 20 to close port 17.

Casing 27 has a plurality of circumferentially spaced bores 35 aligned with a corresponding plurality of circumferentially spaced threaded bores 36 in casing 11. A plurality of headed bolts 38 extend through the bores 35 into the threaded bores 36 in the casing 11, whereby the casing 27 is clampingly secured to the casing 11.

It will be appreciated that the clamping pressure exerted by the bolts 38 retains the enlarged bead or rim 39 of the diaphragm in the juxtaposed grooves 24 and 34, and in addition, defines a fluid-tight seal between the opposed faces of the casings 11 and 27.

As shown, the valve seat 20 is located in closely spaced relation to the upper surface 16 of the partition 15. Preferably, for greatest sensitivity and effectiveness in damping high frequency pulses, the distance between the center line of the conduit or bore 12 and the level of the seat 20 is less than the diameter of the aperture 17.

It will be recognized that the diaphragm 21 divides the space between the floor F-1 of casing 11 and the upper wall F-2 of the casing 27, into the two chambers C-1 and C-2. The volume of the respective chambers will vary in accordance with the pressure conditions within the conduit.

Initially, gas under pressure is charged into the chamber C-2 through the gas charging valve assembly 33, whereupon the pressure in the chamber C-2 exceeds the pressure in the chamber C-1, resulting in a downward expansion of the diaphragm and movement of the valve disc 20' against the seat 20, sealing the aperture 17.

Fluid under pressure is admitted to the conduit 12 and when the pressure in the conduit exceeds the pressure in the chamber C-2, the valve disc 20' will be unseated and the volume within chamber C-1 will increase, with a concomitant decrease in the volume of chamber C-2 and compression of the gas therein.

The movement of the diaphragm and compression of the gas within the chamber C-2 result in energy absorption and consequent damping of the pulses sensed within the conduit 12.

It will be recognized that the greater the movement of the valve away from the seat, the greater will be the cross sectional area of the flow passage around the upper surface 16 of the partition 15.

By disposing the movable valve member 20' in close proximity to the upper edge of the partition 15 and the restricted flow passage 19, and by making the area of the aperture 17 a relatively high percentage of the diaphragm, e.g., about 10 percent or more, the device has been found particularly sensitive to and effective in the damping of high frequency pulses in that the diaphragm will react rapidly.

Without limitation to any specific theory, it is believed that the close proximity of the valve member 20' to the conduit 12 and the relatively high ratio of the area of the aperture 17 to the area of the diaphragm 21 together with the impingement of the fluid from the conduit flowing through aperture 17 simultaneously against substantially the major portion of the area of the diaphragm in direction substantially perpendicular thereto, enables the valve 20' to respond more promptly to sensed high frequency pulses. This is due in part to the lower mass of interposed oil and substantially simultaneous reaction of a large area of the surface of the diaphragm exposed in the oil chamber, with resultant improved coupling of the diaphragm to the conduit.

The prompt sensing, coupled with the fact that the cross sectional flow of fluid into chamber C-1 increases rapidly with progressive unseating of the valve member 20', produces a cooperative interaction resulting in improved damping performance.

A further advantage of the described construction lies in its adaptability to change with minimal modification, providing a construction in which relatively few stock parts enable the creation of pulse dampeners for a wide range of hydraulic installations. Thus, should it be desired that a larger chamber C-2 be created, it is merely necessary to provide a casing member 27 having a deeper recess 31 and, hence, a greater volume.

It will be recognized by those skilled in the art that numerous variations and modifications may be made in the described concept in the light of the instant disclosure. Accordingly, the invention is to be broadly construed within the scope of the appended claims.

Having thus described my invention, what I claim as new and desire to secure by Letters Patent of the United States is:

1. A high frequency pulse dampener device comprising a rigid casing having a bore therethrough defining a conduit member, an upwardly directed aperture formed in said casing at right angles to said bore and in communication therewith at one end, said casing having an upwardly extending concave recess defining an oil chamber, said recess having a floor, said other end of said aperture being exposed in said floor and axially positioned therein, the periphery of said other end of said aperture defining a valve seat, a partition formed in said casing in registry with said aperture, said partition being directed normal to said bore and having its outer terminal edge portions coincident with the walls defining said bore, the upper edge of said partition terminating in proximate spaced relation to said valve seat and below the top of said bore, there being defined between said upper edge of said partition and said aperture, passage means for conducting fluid through said bore from one side of said partition to the other, a restricted flow aperture formed in said partition in axial alignment with said conduit member, the level of said valve seat being spaced from the level of the axis of said restricted flow aperture a distance substantially less than the diameter of said upwardly directed aperture, a second rigid casing complementary to said first casing, said second casing having a downwardly extending concave recess therein complementary to the recess in said first casing and defining a gas chamber, said second recess having a top wall, a port extending through said second casing axially into said second recess, a gas charging member mounted in said port, means to retain said casings together with said recesses in juxtaposition, a distensible, resilient diaphragm member clampingly supported at its periphery between said two casings, said oil chamber and said gas chamber being formed respectively between said diaphragm member and the floor and top wall of the recesses in said casings, and a valve member carried by said diaphragm and shiftable into sealing and unsealing relation against said valve seat responsive to movements of said diaphragm respectively toward and away from said seat, the area of said upwardly directed aperture being at least ten percent of the area of the diaphragm member which is exposed to the flow of fluid through said aperture.

2. Apparatus in accordance with claim 1 in which each of said casings adjacent the periphery of the concave recess therein has an annular recess, which recesses when juxtaposed define an annular cavity, the periphery of said diaphragm member having a thickened rim positioned in said annular cavity.

* * * * *